(12) United States Patent
Weil

(10) Patent No.: US 9,386,829 B2
(45) Date of Patent: Jul. 12, 2016

(54) LANYARD AND PERSONAL EMERGENCY TRANSMITTER SYSTEM

(75) Inventor: Jonathan L. Weil, Seattle, WA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 651 days.

(21) Appl. No.: 13/381,985

(22) PCT Filed: Jul. 19, 2010

(86) PCT No.: PCT/IB2010/053267
§ 371 (c)(1),
(2), (4) Date: Jan. 3, 2012

(87) PCT Pub. No.: WO2011/031026
PCT Pub. Date: Feb. 3, 2011

(65) Prior Publication Data
US 2012/0105223 A1    May 3, 2012

(30) Foreign Application Priority Data

Jul. 28, 2009  (EP) ..................................... 09166541

(51) Int. Cl.
| | | |
|---|---|---|
| *G08B 1/08* | (2006.01) | |
| *A45B 5/00* | (2006.01) | |
| *F16G 11/10* | (2006.01) | |
| *G08B 13/14* | (2006.01) | |
| *G08B 13/00* | (2006.01) | |
| *A62B 35/00* | (2006.01) | |
| *A45F 5/00* | (2006.01) | |
| *A45F 3/00* | (2006.01) | |

(52) U.S. Cl.
CPC . *A45B 5/00* (2013.01); *F16G 11/10* (2013.01); *A45F 5/004* (2013.01); *A45F 2003/002* (2013.01); *A45F 2005/006* (2013.01)

(58) Field of Classification Search
USPC ................. 340/539.11; 206/37; 119/856, 770
See application file for complete search history.

(56) References Cited

U.S. PATENT DOCUMENTS

| | | |
|---|---|---|
| 3,819,177 A | 6/1974 | Spiro |
| 5,533,238 A | 7/1996 | Say |
| 5,669,242 A * | 9/1997 | Cayton .............................. 63/21 |
| 6,073,317 A | 6/2000 | Barison |
| 6,281,800 B1 * | 8/2001 | Sizemore ...................... 340/574 |
| 6,539,588 B1 | 4/2003 | Brosofsky et al. |
| 6,615,460 B1 | 9/2003 | Baumgarten |
| 6,666,647 B1 | 12/2003 | Trask |
| 6,826,806 B2 | 12/2004 | Eaton et al. |

(Continued)

FOREIGN PATENT DOCUMENTS

| | | |
|---|---|---|
| AU | 569604 B2 | 2/1988 |
| EP | 0750135 A1 | 12/1996 |

(Continued)

*Primary Examiner* — Jack K Wang

(57) ABSTRACT

A lanyard device (5) comprises a first cord (10) coupled to a first and second coupling means (20, 30) which can be detachably coupled. The first cord is arranged in a loop that can be worn around a user's (200) neck. The first and second coupling means realize a safety release feature that minimize the risk of strangulation by opening the loop when a predetermined force acts on the first cord. The lanyard device further comprises a retention feature that keeps a communication device (110) attached to the lanyard device in the vicinity of the user in case the release feature is activated. The retention feature may be realized by a second cord (40) which is also coupled to the first and second coupling means.

19 Claims, 4 Drawing Sheets

(56) References Cited

U.S. PATENT DOCUMENTS

| | | | |
|---|---|---|---|
| 2003/0121125 A1 | 7/2003 | Raia et al. | |
| 2004/0032333 A1* | 2/2004 | Hatt | 340/574 |
| 2004/0056061 A1 | 3/2004 | Yang | |
| 2004/0232010 A1 | 11/2004 | Thomason et al. | |
| 2006/0219741 A1* | 10/2006 | Clark | 223/111 |
| 2007/0074375 A1* | 4/2007 | Papernik | 24/1 |
| 2007/0107477 A1* | 5/2007 | Fawcett et al. | 70/57.1 |
| 2008/0250616 A1* | 10/2008 | Martin | 24/68 J |
| 2009/0120130 A1* | 5/2009 | Mabra | 63/3.1 |
| 2009/0316109 A1* | 12/2009 | Hellberg | 351/157 |
| 2010/0066558 A1* | 3/2010 | McCauley | 340/825.49 |
| 2010/0133307 A1* | 6/2010 | Martin et al. | 224/257 |
| 2010/0319413 A1* | 12/2010 | Nilsson | 70/18 |

FOREIGN PATENT DOCUMENTS

| | | |
|---|---|---|
| JP | H09305875 A | 11/1997 |
| JP | 2006296743 A | 11/2006 |
| JP | 2007213533 A | 8/2007 |
| WO | 2005068846 A1 | 7/2005 |
| WO | 2007011336 A1 | 1/2007 |
| WO | 2008087473 A1 | 7/2008 |
| WO | 2009014714 A2 | 1/2009 |

* cited by examiner

LANYARD AND PERSONAL EMERGENCY TRANSMITTER SYSTEM

FIELD OF THE INVENTION

The invention relates to a lanyard device and an emergency response system comprising the lanyard device.

BACKGROUND OF THE INVENTION

Many people in the workplace perform tasks where both hands are needed and other items must be kept within easy reach. To keep such an item within easy reach said item may be attached to a lanyard device. A lanyard device is a small cord or rope typically used in securing or suspending a small object around a person's neck. The lanyard device is useful for storing and/or carrying essential items in a secure, accessible location.

US2004/0232010 discloses an adjustable breakaway lanyard device including a first end and a second end where the first and second ends include a retaining means that can be selectively disengaged when a predetermined force is applied to the retaining means. The selectively disengaging permits the lanyard device to break away from itself so as to prevent a choking hazard for the wearer. A disadvantage is that at the disengaging the lanyard device and the small object attached to it may drop and get out of reach of the wearer.

SUMMARY OF THE INVENTION

It is an object of the invention to provide a lanyard device that remains in reach of the wearer after the disengaging of the retaining means.

The object of the invention is achieved with a lanyard device according to claim 1. The invention is based on the insight that the known breakaway lanyard device is predicated on one risk only: the risk of strangulation or the risk of the wearer's neck being pulled in a dangerous way. The known break away lanyard device does not reflect any risk or danger associated with no longer having the item attached to the lanyard device easily accessible to the wearer after separation, as in the case of a security or emergency communication device being attached to the lanyard. In the lanyard device according to the present invention a second flexible cord coupled to the first and second coupling means prevents the lanyard device from becoming separated from the wearer and thus out of reach. A loop formed by the lanyard device encircles the wearer's neck. After the decoupling of the first and second coupling means as a result of a predetermined force acting on them the length of the loop has increased from the length of the first flexible cord to the length of the first flexible cord plus the second flexible cord. The additional available length of the second flexible cord minimizes the risk of strangulation or a dangerous pull of the wearer's neck. At the same time, as the second flexible cord is coupled between the first and second coupling means, the lanyard device stays within reach of the wearer even after decoupling of the first and second coupling means.

The first flexible cord may for example have the shape of a flat cable with hook and loop fasteners at its corresponding ends. Examples of said hook and loop fasteners are known under the brand name Velcro. The hook and loop fasteners are examples of first and second coupling means that may be detachably coupled. The predetermined force acting on the first flexible cord causes the hook and loop fasteners to decouple. As a result the length of the loop that encircles the wearer's neck has increased from the length of the first flexible cord to the length of the first flexible cord plus the second flexible cord. The flat cable may for example be made of woven textile. In another embodiment of the lanyard device the first flexible cord and/or the second flexible cord are made of ribbon, webbing or cable.

In an embodiment of the lanyard device the length of the second flexible cord is twice the height of the person wearing the lanyard device around its neck, and preferably at least larger than twice the height of said person minus the length of the first flexible cord. This length has the advantage that the second flexible cord may not come under tension if a person that wears the lanyard device falls and in the fall the lanyard device becomes caught on some object, thus applying tension to the first and second coupling means causing them to decouple.

In a further embodiment of the lanyard device the second flexible cord is detachably coupled to the first or second coupling means. This provides the advantage that in case the lanyard gets entangled by a moving object the second flexible cord does not cause the wearer to become strangled. This further provides the further advantage that the lanyard may be easily re-used in case the second cord has detached under a further predetermined force acting on it.

In a further embodiment the attachment of the second flexible cord is arranged so that under a further predetermined force acting on it the second flexible cord breaks to prevent a possible pull to the wearer's neck with a too large force. In said embodiment the tensile strength of the second flexible cord or the strength of the coupling of the second flexible cord to the first or second coupling means may be preferably arranged such that said further predetermined force is smaller than the predetermined force, so that the risk of strangulation due to the second flexible cord is minimized. Or in another embodiment the coupling of the first and second coupling means is arranged such that the predetermined force that causes a decoupling of the first and second coupling means corresponds to the maximal allowed pull to the wearer's neck.

In a further embodiment the first flexible cord is arranged in a loop that is suitable to encircle a person's neck. Said first flexible cord further comprises third and fourth coupling means that are arranged to be detachably coupled. The third and fourth coupling means allow for an easy fit of the lanyard around the wearer's neck without requiring the lanyard device to be pulled over one's head. The third and fourth coupling means may for example be 'snap' fit.

In a further embodiment the first coupling means further comprises means to store the second flexible cord when such cord is coiled. The storage means provides a convenient place to store the second flexible cord and to protect such cord from damage or becoming caught on an external object.

In a further embodiment the first coupling means further comprises spooling means arranged to spool the second flexible cord. The spooling means provides a convenient place to store the second flexible cord.

In a further embodiment the spooling means are stored in the first coupling means. This provides the advantage that the enclosure of the first coupling means is protecting the spooling means.

In a further embodiment the spooling means comprises a spool that is rotatable mounted to the first coupling means. A spring acts on the spool so as to cause the second flexible cord to be spooled thereby keeping the second flexible cord pulled tight. When the first and second coupling means are coupled the spring force causes the second flexible cord to be spooled. This provides the advantage that by decoupling the first and second coupling means the length of the loop can be easily enlarged making it easier to pull the lanyard device over one's head. After having done so the length of the loop is easily reduced again by the coupling of the first and second coupling means wherein the spring force causes the second flexible cord to be spooled.

In a further embodiment of the invention a personal emergency response system is attached to the invented lanyard device. Said personal emergency response system comprises a portable wireless device that allows the wearer to summon help, for example by pressing a button. The lanyard device according to the invention provides the advantage that the personal emergency response system does not get out of reach in case the first and second coupling means decouple. For example of a personal emergency response system may comprise lanyard device with an attached communication device which enables a user to request for help. Said system is worn as a pendant around the user's neck. In case the user falls the cord included in the lanyard device may become caught on some object causing tension to be applied to the safety release feature formed by the first and second coupling means. In case of an absence of retention means the personal emergence response system could be flung some distance from the wearer, making it inaccessible for the user. In the invented lanyard device the retention means is formed by the second flexible cord which is also attached to the first and second coupling means. The retention means keeps the communication device in the immediate vicinity of the user enabling him to request help after the fall.

In a further embodiment said system may comprise fall detection means, the portable wireless device being arranged to transmit a request for help in case of a detected fall.

In a further embodiment said system may be arranged to detect a breaking or detaching of the second flexible cord and transmit the request for help when a broken or detached second flexible cord is detected.

BRIEF DESCRIPTION OF THE DRAWINGS

Preferred embodiments of the invention will now be described, by way of example only, with reference to the following drawings, in which:

FIG. 1 comprising

FIG. 3 comprising

FIG. 4 comprising

DETAILED DESCRIPTION OF THE PREFERRED EMBODIMENTS

Known lanyard devices are used for wearing an item such as an ID card or key around the neck using a cord to which the item is attached. Those lanyard devices may have a safety release feature to avoid the risk of a possible strangulation may the wearer become caught in some device. This safety release feature causes the cord to open if tension is applied to it. This opening may be realized with a breakaway closure device, such as for example disclosed in U.S. Pat. No. 6,826,806.

Figures 1A, 1B:
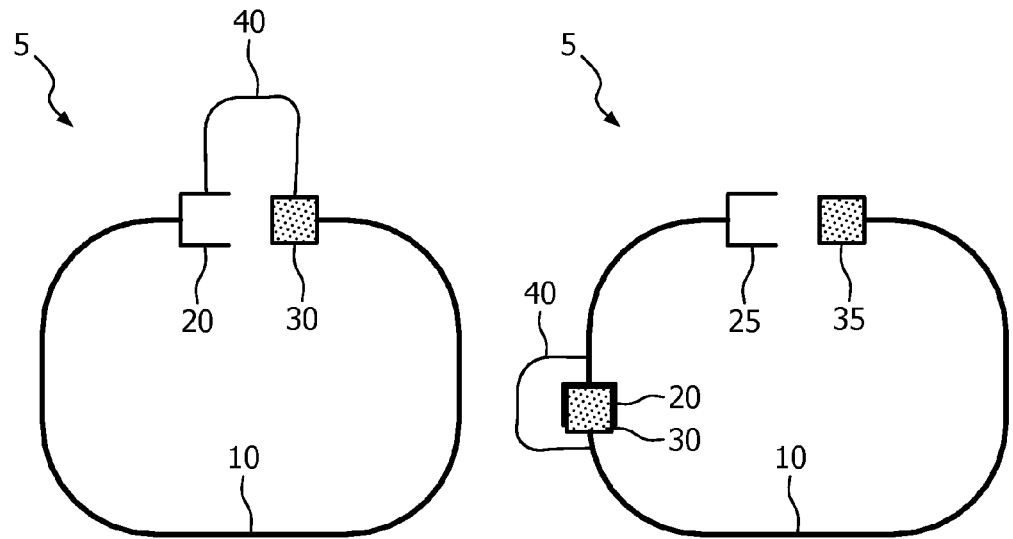
FIGS. 1a and 1b show embodiments of a lanyard device comprising a first flexible cord with decoupling means and a second flexible cord coupling the end portions of the first flexible cord.

FIG. 1a shows a lanyard device 5 comprising first and second coupling means 20, 30. Said first and second coupling means are for example mating parts that may be connected to each other. These parts may for example be of resilient or deformable plastic that for example 'snap' fit to each other or have a friction based coupling. The first and second coupling means may in another example be realized using hook and loop fasteners. Or in a further example, the first and second coupling means may comprise magnetic material such that these first and second coupling means are attracted to each other. The first and second coupling means are further arranged to be detachably coupled to each other such that when a predetermined force acts on them they decouple, thereby forming a breakaway closure device. The predetermined force may for example act on the first flexible cord 10 in case an item attached to the lanyard device gets entangled with an object moving relative to the lanyard device. The first flexible cord transfers this predetermined force to the coupled first and second coupling means 20, 30 causing them to decouple. For example the hook and loop fasteners may be decoupled as a result of force acting on them. Also the magnetic first and second coupling means may decouple when a force larger than the magnetic attracting force acts on them. In this example the predetermined force acting on the first and second coupling means must be larger magnetic attracting force to result in a decoupling. This makes it possible to limit the maximal pull to the wearer's neck by dimensioning of the magnets, as with the dimensioning of the magnets the magnetic attracting force of the first and second coupling means 20, 30 may be determined. The lanyard device 5 comprises a first flexible cord 10 that is coupled with its end to the first and second coupling means 20, 30. The lanyard device according to the invention further comprises a second flexible cord 40 that is also coupled with its ends to the first and second coupling means 20, 30. When as a result of the predetermined force the first and second coupling means decouple, the length of the cord encircling a wearer's neck increases to the sum of the length of the first flexible cord 10 and the second flexible cord 40. Thus unlike the prior art lanyard devices the lanyard device according to the invention remains encircling the neck if tension is applied to the lanyard device, and therefore remains in the vicinity of the wearer. An important item attached to the lanyard device will therefore stay within reach, and the risk that the item is lost has reduced. In the invented lanyard device the safety release feature realized by the first and second coupling means are arranged to release a dangerous tension on the lanyard, while the second flexible cord realizes a retention feature causing the lanyard device to be kept around the neck of the wearer, and hence keeping an item attached to the lanyard device accessible for use. The second flexible cord is an example of a retention means.

FIG. 1b shows a further embodiment of a lanyard device 5 comprising third and fourth coupling means 25, 35. This embodiment has the advantage that the lanyard device 5 may be easily put around a person's neck by opening of the loop formed by the first and second flexible cord 10, 40 of the lanyard device. This may be more convenient than pulling the lanyard device over one's head, as is required with the lanyard device of FIG. 1a. The third and fourth coupling means may be of a similar type as the first and second coupling means and decouple as a result of applied tension. However if the third and fourth coupling means also have a safety release feature they should be arranged such that they do not decouple before the first and second coupling means 20, 30.

Figure 2:
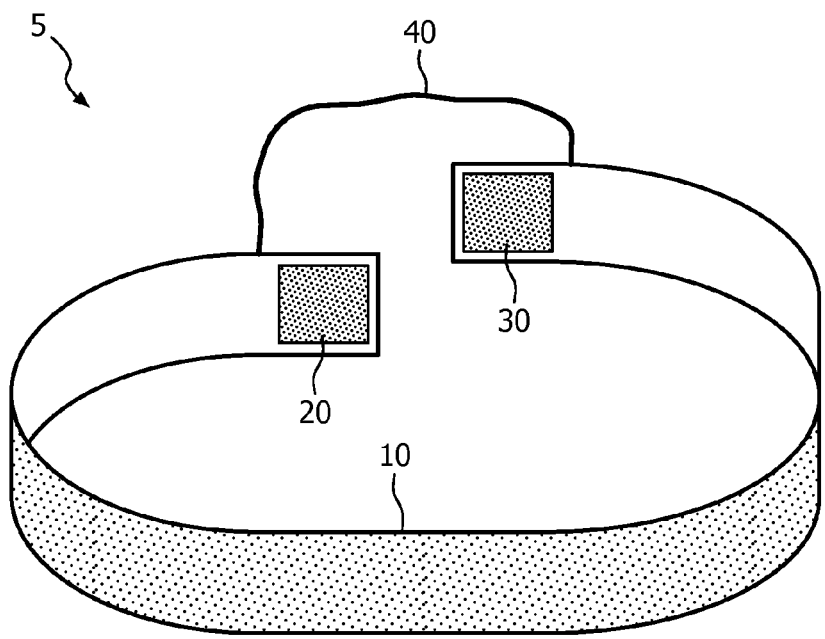
FIG. 2 shows a further embodiment of a lanyard device.

FIG. 2 shows a further embodiment of the lanyard device of FIG. 1a wherein the first flexible cord is realized as a ribbon 10 having hook and loop fasteners 20, 30 attached to its ends.

In this embodiment the second flexible cord 40 is connected to the ends of the ribbon and not to the first and second coupling means.

Figure 3A:
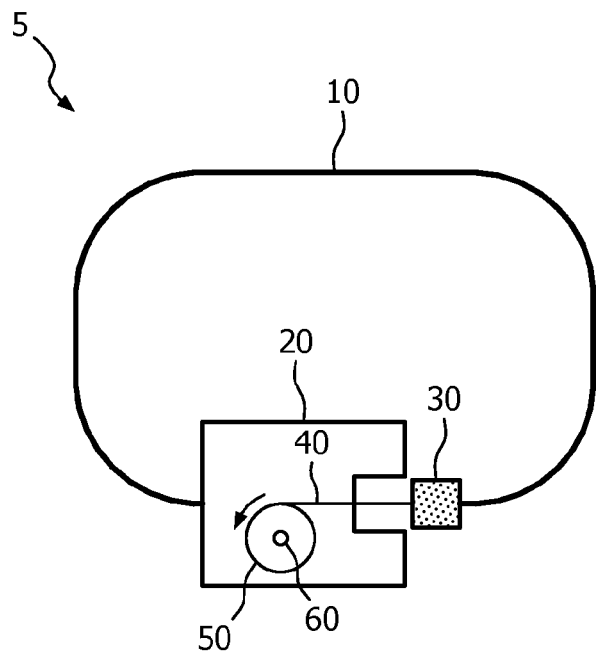
FIGS. 3a and 3b shows embodiments of a lanyard device having decoupling means that are arranged to store the second flexible cord.
Figure 3B:
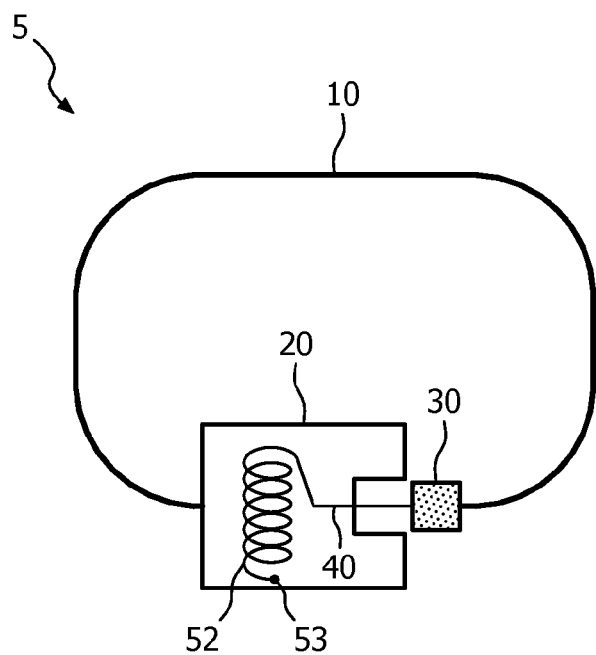

FIG. 3*a* shows a further embodiment of a lanyard device 5 having a first coupling means 20 with integrated spooling means 50, 60 for storing the second flexible cord 40. The spooling means comprise a rotatable spool that is arranged to keep the second flexible cord under tension as a result of a force of a spring 60 acting on the spool. The tension generated by the spring force is arranged to be smaller than the predetermined force which when acting on the first and second coupling means 20, 30 causes them to decouple. As the second cord 40 may have considerable length (for example twice the length of a person wearing the lanyard device) it is convenient and safe when it is stored on the spool 50. In FIG. 3*b* the second flexible cord 40 is coiled and stored in the first coupling means 20 as long as the first and second coupling means 20, 30 are coupled. The coiled second flexible cord 52 is attached with one end 53 to the first coupling means 20, the other end being coupled to the second coupling means 30. When as a result of a predetermined force acts on the first and second coupling means the first and second coupling means decouple the second flexible cord will be pulled out of the first enclosing means.

Figure 4A:
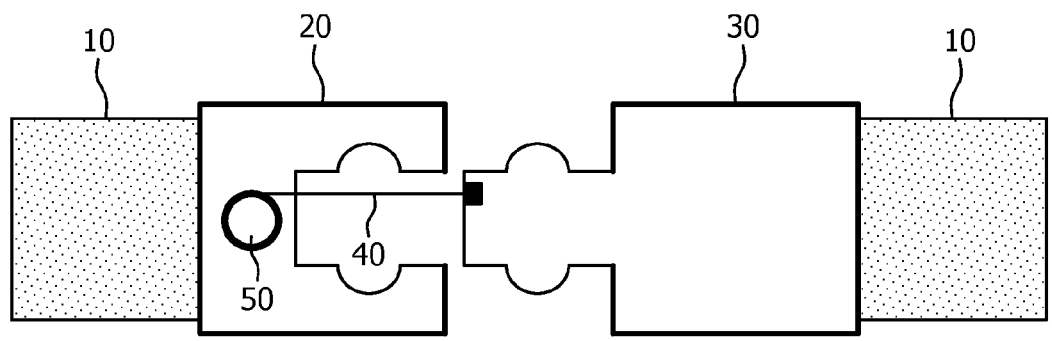
FIGS. 4a and 4b show embodiments of decoupling means enclosing spooling means.

FIG. 4*a* shows a further embodiment of a lanyard device having first and second coupling means 20, 30 which are realized as mating parts. These parts are for example made of deformable material allowing an extension of the second coupling means 30 to be pushed in a cavity of the first coupling means 20. The extension and the cavity have corresponding shapes to realize a fit, the coupling resulting in a 'snap' fit. By dimensioning of the shape of the extension and cavity a safety release feature may be realized. After having been coupled the first and second coupling means may be decoupled as a result of the predetermined force acting on the first or second coupling means. The first and second coupling means are further coupled to a ribbon 10 which implements the first flexible cord. The first coupling means 20 comprises the spooling means 50 that stores the cable 40, one end of the cable being coupled to the spool which is included in the spooling means, the other end of the cable being detachably coupled to second coupling means 30. The cable 40 is an exemplifying embodiment of a second flexible cord.

Figure 4B:
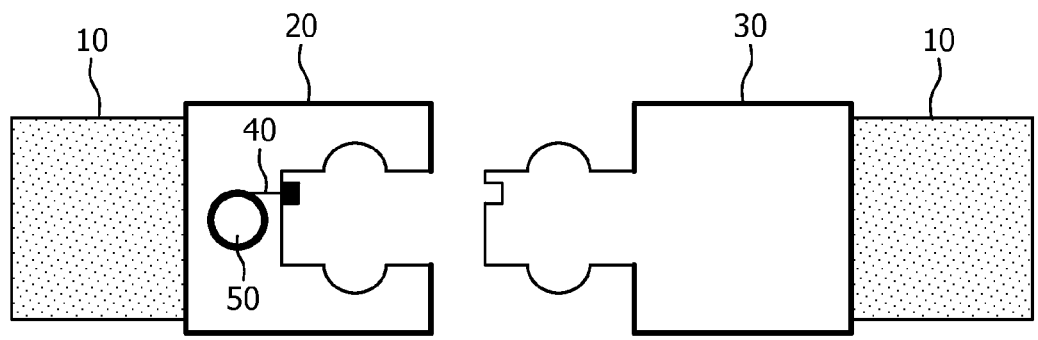

FIG. 4*b* shows the lanyard device of FIG. 4*a* wherein the cable has decoupled from the second coupling means 30 as a result of the further predetermined force acting on the first and second coupling means 20, 30. When the first and second coupling means are decoupled to prevent a possible strangulation of the wearer of the lanyard device the cable 40 will roll out. When the cable has rolled out completely it may be decoupled from the second coupling means 30 in case a further predetermined force is still pulling the first or second coupling means. This decoupling prevents that the predetermined force will cause a pulling of the neck of the wearer. When the second coupling means 30 is pushed in the first coupling means 20 they will be coupled again. Also the other end of the cable 40 will be coupled to the second coupling means 30 again.

Figure 5:
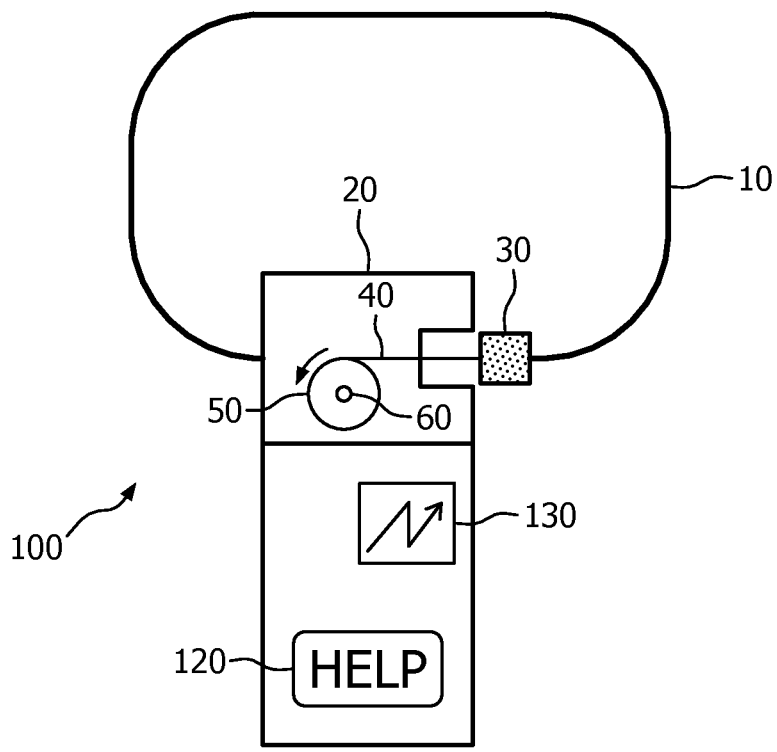
FIG. 5 shows an embodiment of a personal emergency response system comprising a lanyard device.

FIG. 5 shows a personal emergency response system 100 which comprises a portable wireless device 110 that allows a person 200 to summon help. The portable device 110 is coupled to the invented lanyard device 5 enabling the device to be worn around the person's neck, making it possible to request help or communicate with a caregiver when needed. The portable wireless device 110 may for example comprise a help button 120 which, when pushed, causes a request for help to be transmitted to a caregiver. The portable wireless device further comprises transmitting means 130 such as for example an FM transmitter. In a further embodiment the first and second flexible cord 10, 40 comprise conductive material resulting in a conductive loop. This enables an electronic detection of the opening of the loop caused by decoupling or breaking of the second flexible cord 40. An opening of this loop may indicate that the personal emergency response system is not in the vicinity of the wearer anymore due to a potential hazardous situation or incident. Upon detection of the opening of the loop the personal emergency response system 100 may send a request for help.

Figure 6:
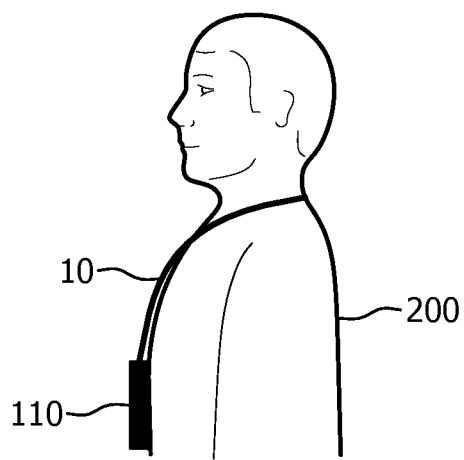
FIG. 6 shows a person wearing a personal emergency response system comprising a lanyard device.

FIG. 6 shows a person 200 wearing a personal emergency response system 100 comprising a lanyard device 10 according to the invention and a portable wireless device 110. The portable wireless device 110 may for example be a communication device, such as for example a mobile phone. Presently a designer of a personal emergency system must consider whether the risk of strangulation from not incorporating a safety release feature on the lanyard device outweighs the risk that the wearer cannot summon help if the safety release feature is activated. With the lanyard device according to the invention these apparently contradicting requirements can be met. The safety release feature minimizes the risk of strangulation while at the same time the included retention feature keeps the portable wireless device accessible to the wearer in case the safety release feature was activated.

To summarize the invented lanyard device 5 comprises a first cord 10 coupled to a first and second coupling means 20, 30 which can be detachably coupled. The first cord is arranged in a loop that can be worn around a user's 200 neck. The first and second coupling means realize a safety release feature that minimize the risk of strangulation by opening the loop when a predetermined force acts on the first cord. The lanyard device further comprises a retention feature that keeps a communication device 110 attached to the lanyard device in the vicinity of the user in case the release feature is activated. The retention feature may be realized by a second cord 40 which is also coupled to the first and second coupling means.

While the invention has been illustrated and described in detail in the drawings and foregoing description, such illustration and description are to be considered illustrative or exemplary and not restrictive; the invention is not limited to the disclosed embodiments.

Variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. Any reference signs in the claims should not be construed as limiting the scope.

The invention claimed is:

1. A lanyard device comprising:
   a first flexible cord having a first end and a second end,
   a first and a second coupling means, the first coupling means arranged to be coupled to the first end and the second coupling means arranged to be coupled to the second end,
   wherein the first coupling means are further arranged to be detachably coupled to the second coupling means, and wherein the first and second coupling means are further arranged to be decoupled as a result of a predetermined force acts on the first and second coupling means,
   the lanyard device being characterized in further comprising a second flexible cord coupling the first coupling means and second coupling means wherein the second flexible cord is arranged to break when a further predetermined force acts on it, wherein the further predetermined force causing the second flexible cord to break is smaller than the predetermined force causing the first and second coupling means to be decoupled.

2. The lanyard device of claim 1 wherein a length of the second flexible cord is twice a height of a person wearing the lanyard device around its neck.

3. The lanyard device according to claim 1 wherein the second flexible cord is configured of conductive material, such that the breaking of the second flexible cord can be electronically detected.

4. The lanyard device according to claim 3 further including:
an electronic device which detects the breaking of the second flexible cord and in response to detecting breaking of the second flexible cord, sends a help request.

5. The lanyard device according to claim 1 wherein the first flexible cord is arranged in a loop, the first flexible cord further comprising third and fourth coupling means arranged for opening and closing of the loop.

6. The lanyard device according to claim 1 wherein the first coupling means further comprises spooling means arranged to spool the second flexible cord.

7. The lanyard device according to claim 6 wherein the first coupling means is arranged to enclose the spooling means.

8. The lanyard device according to claim 6 wherein the spooling means comprises a spool arranged to be rotatable mounted to the first coupling means and coupled to one end of the second flexible cord, the other end of the second flexible cord arranged to be coupled to the second coupling means, said spooling means further comprising a spring arranged to act on the spool so as to cause the second flexible cord to be spooled and the second flexible cord to be kept pulled tight.

9. The lanyard device according to claim 1 wherein the second flexible cord is arranged to be coiled and stored in the first coupling means, the first coupling means being arranged to enclose the coiled second flexible cord when the first and second coupling means are coupled.

10. A breakaway lanyard comprising:
a first flexible cord configured and sized to be worn around a person's neck and having a first end and a second end;
a first coupling element attached to the first end and a second coupling element attached to the second end of the first flexible cord, the first coupling element and the second coupling element being configured to couple together to hold the flexible cord in a loop around the person's neck and being configured to decouple under a first, predetermined force such that the lanyard breaks away under the first predetermined force to protect the person from strangulation;
a second flexible cord having one end coupled to the first coupling element and another end coupled to the second coupling element;
a releasable coupler attached to the one end of the flexible cord configured to be releasably coupled to the first coupler element to release in response to a second predetermined force allowing the second flexible cord to detach from the first flexible cord at the one end, the second predetermined force being less than the first predetermined force.

11. The breakaway lanyard according to claim 10, wherein the second flexible cord is electrically conductive and wherein the releasable coupler which releasably couples the one end of the second flexible cord with the first coupling element includes an electrical interconnection such that decoupling the one end of the second flexible cord from the first coupling element is electrically detectable and further including:
an electronic detection circuit configured to detect the decoupling and transmit a help request in response to the decoupling.

12. The breakaway lanyard according to claim 10, further including:
another coupling arrangement disposed in the first flexible cord displaced from the first and second ends such that the first flexible cord can be opened to position it around the person's neck and remove it from around the patient's neck without decoupling the first and second coupling elements or putting the first and second flexible cords over the person's head.

13. The breakaway lanyard according to claim 10, wherein the another end of the second flexible cord is connected with a spring-biased spool disposed in the second coupling element, the spool being spring-biased to wrap the second flexible cord around the spool and retract the second flexible cord into the second coupling element.

14. The breakaway lanyard according to claim 10, wherein the second coupling element includes a storage compartment therein configured to store the second flexible cord.

15. The breakaway lanyard according to claim 10, wherein one of the first and second coupling elements includes a help button and a transmitter configured such that in response to the person actuating the button, the transmitter transmits a request for help.

16. A breakaway lanyard comprising:
a first flexible cord configured and sized to be worn around a person's neck and having a first end and a second end;
a first coupling element attached to the first end and a second coupling element attached to the second end of the first flexible cord, the first coupling element and the second coupling element being configured to couple together to hold the flexible cord in a loop around the person's neck and being configured to decouple under a first, predetermined force such that the lanyard breaks away under the first predetermined force to protect the person from strangulation;
a second flexible cord having one end coupled to the first coupling element and another end coupled to the second coupling element;
a releasable coupler attached to the one end of the flexible cord configured to be releasably coupled to at least one of the first and second coupler elements to release in response to a second predetermined force allowing the second flexible cord to detach from the first flexible cord at the one end, the second predetermined force being less than the first predetermined force;
wherein one of the first and second coupling elements includes a transmitter configured to transmit a help request in response to the releasable coupler becoming detached.

17. A breakaway lanyard comprising:
a first flexible cord configured to be worn around a person's neck, the first flexible cord having a first end and a second end;
first and second coupling elements connected with the first and second ends of the first flexible cord, the first and second coupling elements being configured to detachably couple to each other to hold the first flexible cord around the person's neck and to detach from each other in response to a first predetermined force permitting the lanyard to release from the person's neck;

a second flexible cord having a first end connected with the first coupling element and a second end connected with the second coupling element, the second flexible cord being configured to at least one of break and detach from one of the first and second coupling elements in response to a second predetermined force on the first flexible cord.

18. The breakaway lanyard as set forth in claim 17, wherein the second predetermined force is less than the first predetermined force.

19. The breakaway lanyard according to claim 17, wherein one of the first and second coupling elements includes a transmitter configured to transmit a help request in response to the second flexible cord breaking or detaching.

* * * * *